US008061653B2

(12) United States Patent
Chow et al.

(10) Patent No.: US 8,061,653 B2
(45) Date of Patent: Nov. 22, 2011

(54) LANDING GEAR

(75) Inventors: Leung Choi Chow, Bristol (GB); Christopher Neil Wood, Congleton (GB); Philip Campbell, Stockport (GB)

(73) Assignee: Airbus Operations Limited, Bristol (GB)

( * ) Notice: Subject to any disclaimer, the term of this patent is extended or adjusted under 35 U.S.C. 154(b) by 394 days.

(21) Appl. No.: 12/068,599

(22) Filed: Feb. 8, 2008

(65) Prior Publication Data
US 2008/0191090 A1     Aug. 14, 2008

(30) Foreign Application Priority Data

Feb. 14, 2007 (GB) .................................. 0702866.5

(51) Int. Cl.
*B64C 25/10* (2006.01)
(52) U.S. Cl. ............ 244/102 SL; 244/102 R; 244/102 A
(58) Field of Classification Search ............ 244/102 SL, 244/102 R, 102 A
See application file for complete search history.

(56) References Cited

U.S. PATENT DOCUMENTS

| | | | | |
|---|---|---|---|---|
| 4,556,179 A | * | 12/1985 | Veaux et al. ............. | 244/102 R |
| 5,029,775 A | * | 7/1991 | Abramovitsh ........... | 244/102 R |
| 5,269,481 A | * | 12/1993 | Derrien .................... | 244/102 R |

FOREIGN PATENT DOCUMENTS

| | | |
|---|---|---|
| GB | 464144 | 4/1937 |
| GB | 475222 | 11/1937 |
| GB | 578987 | 4/1945 |
| GB | 639811 | 7/1950 |
| GB | 648362 | 1/1951 |
| GB | 704080 | 2/1954 |

OTHER PUBLICATIONS

Great Britain Search Report for GB 0702866.5 dated Jun. 4, 2007.

* cited by examiner

*Primary Examiner* — J. Woodrow Eldred
(74) *Attorney, Agent, or Firm* — Nixon & Vanderhye P.C.

(57) ABSTRACT

An aircraft landing gear 501 includes a folding side stay 502, wherein the folding side stay includes an integral locking mechanism and does not require the landing gear to include a lock stay. The lack of a lock stay reduces the airframe noise created by the aircraft, which is particularly significant when the aircraft is landing. The aircraft landing gear 501 is movable between a stowed and deployed position. The folding side stay 502 comprises a first section and a second section foldable relative to the first section. The integral locking mechanism 503 is arranged to lock the first section and second section of the folding side stay into position when the landing gear is in the deployed position.

16 Claims, 8 Drawing Sheets

LANDING GEAR

This application claims priority to Great Britain Application No. 0702866.5 filed Feb. 14, 2007, the entire content of which is hereby incorporated by reference.

This invention relates to aircraft landing gear, more particularly, aircraft landing gear including folding side stays.

BACKGROUND OF THE INVENTION

It is desirable to reduce the noise that an aircraft makes when it is operating, for example to lessen disruption or inconvenience. There also exist regulations that limit the noise that an aircraft may make-when taking off and landing. Two main elements combine to create the noise of an aircraft flying; the engine noise and the airframe noise produced by the air flowing past the aircraft, which results in turbulent flows and consequently noise. When an aircraft takes off the engine noise dominates the airframe noise as the engines are on full power. However, when an aircraft lands the engines are on flight idle, a reduced power level, exposing the airframe noise, which dominates by producing about half of the noise created. A significant contribution to the airframe noise is made by the aircraft landing gear, which for safety reasons are typically deployed early when landing.

A typical landing gear 101 on an aircraft (as shown in FIG. 1) is movable between a stowed and deployed position. The stowed position is when the landing gear is retracted and housed within either the wings or body of the aircraft. The deployed position is when the landing gear is extended prior to landing. The landing gear 101 includes a main fitting 102, a side stay 103, a lock stay 104 and a down lock actuator 105. The side stay 103 is foldable in order to enable the landing gear 101 to move between the stowed and deployed positions and therefore in order to offer support to the main fitting 102 it is locked into a slightly over centre position by the lock stay 104 which is in turn locked by the down lock actuator 105. As with the rest of the landing gear 101 the folding side stay and the lock stay 104 each contribute to airframe noise by displacing air as the aircraft flies.

SUMMARY OF THE INVENTION

The present invention seeks to mitigate or overcome one or more of the above-identified disadvantages associated with the prior art.

The present invention provides an aircraft landing gear movable between an stowed and deployed position comprising a folding side stay, the folding side stay comprising a first section and a second section foldable relative to the first section and an integral locking mechanism for locking the first section and second section of the folding side stay into position when the landing gear is in the deployed position.

Advantageously, the "self locking" nature of the side stay means that there is no need to include a lock stay or a down lock actuator on the aircraft landing gear. By "self locking" it is meant that the means for locking the folding side stay is included in or on the side stay itself. Eliminating the lock stay and the down lock actuator enables the airframe noise created by the lock stay and the down lock actuator to be eliminated, thereby reducing airframe noise.

It will of course be appreciated that the folding side stay is arranged to assist the landing gear staying in the deployed position. Thus, in use, the side stay may be arranged to be moveable between (i) a folded position, in which the side stay may be stored and is non-operational, and (ii) an unfolded position, in which the side stay resists movement of the landing gear from its deployed position. Movement of the landing gear between the deployed position and the stowed position may be arranged to follow movement of the folding side stay between its folded and unfolded positions, or vice versa. Thus, the landing gear may be arranged such that during normal use, it is not possible to move the landing gear from the stowed position all the way to the deployed position without also causing movement of the folding side stay from its folded to the unfolded position.

The integral locking mechanism may be actuated by a pneumatic, hydraulic or mechanical action. The aircraft landing gear arrangement may include a pneumatic or hydraulic accumulator to drive the integral locking arrangement in case of a pneumatic or hydraulic failure. The integral locking mechanism may be arranged to move along the length of the folding side stay (when unfolded).

The integral locking mechanism may operated by directly locking the means for allowing the folding movement of the side stay (for example a pin, pivot point, or other rotary joint). Such a mechanism could for example be in the form of a releasable formation, for example a moveable pin, of the first section of the side stay arranged to engage with a corresponding formation, for example a cylindrical recess, on the second section, the formations being arranged at or in the region of the axis of folding of the folding side stay.

The integral locking mechanism may be so arranged that when the folding side stay is unfolded and the landing gear is in the deployed position, there are at least two points of engagement that act to resist, and preferably prevent, movement of the first section and second section of the folding side stay apart from each other. At least one of the points of engagement may be formed by means of engagement of a part of the first section of the side stay directly with a part of the second section. At least one of the points of engagement may be formed by means of engagement of a part of the integral locking mechanism with a part of only the first section of the side stay. In such a case, the integral locking mechanism may engage at another point of engagement with a part of only the second section of the side stay. One of the points of engagement may for example be provided by the means for allowing the folding movement of the side stay. At least one of the points of engagement will be provided or caused by the integral locking mechanism, and will be releasable. The points of engagement may need to be separated along the length of the folding side stay. It will be appreciated that the strength of the points of the engagement of the first section and second section will be related to the distance of separation along the length of the side stay; arranging the two points of engagement further apart will enable the side stay to be locked more rigidly and securely. It will also be appreciated that a folding side stay in which the two points of engagement are relatively far apart may be bulkier and more massive, as a result of the necessary overlap required between the first and second sections of the folding side stay, than a folding side stay in which the two points of engagement are closer together.

The integral locking mechanism may be a piston located within the first section of the folding side stay and extendable into the second section of the folding side stay. When the piston is located only within the first section of the folding side stay the folding side stay can fold freely as the aircraft landing gear moves up or down. When the piston is located within both the first section and second section of the folding side stay it restricts the movement of the side stay, locking it into position. In this case, the piston, when in the locking position, may be considered as providing a first point of engagement between a part of the piston with a part of only the first section of the side stay and a second point of engagement with a part of only the second section of the side stay, the first and second points of engagement being at opposite ends of the piston. The integrity and reliability of the locking mechanism in this case will of course depend on the length, rigidity and strength of the piston.

The piston may have a tapered end to aid the location of the piston into the second section of the folding side stay. This accommodates the possibility of the first section and second section of the folding side stay not lining up exactly prior to the extension of the piston from the first section to the second section of the folding side stay.

The integral locking mechanism may be a sleeve located around the outside of the first section of the folding side stay and movable to be partially located over the second section of the folding side stay. When the sleeve is located only around the outside of the first section of the folding side stay the folding side stay can fold freely as the aircraft landing gear moves up or down. When the sleeve is located around the outside of both the first section and second section of the folding side stay it restricts the movement of the side stay, locking it into position. In this case, the sleeve, when in the locking position, may be considered as providing a first point of engagement between a part of the sleeve with a part of only the first section of the side stay and a second point of engagement with a part of only the second section of the side stay, the first and second points of engagement being at opposite ends of the sleeve. The integrity and reliability of the locking mechanism in this case will of course depend on the length, rigidity and strength of the sleeve.

The sleeve may extend telescopically from its initial position.

The locking mechanism may include a stop and the sleeve may be arranged to slide along the folding side stay in the deployed position until it comes to the stop, thus locating the sleeve in the correct position.

The folding side stay may be so arranged that when the landing gear is in the deployed position at least part of the first section of the folding side stay is brought into contact with the second section of the folding side stay and the integral locking mechanism comprises a locking member obstructing the movement the first section and second section of the folding side stay away from each other.

When the locking member is not obstructing the movement of the first section and second section of the folding side stay away from each other, the folding side stay can fold freely as the landing gear moves up or down. When the locking member is obstructing the movement of the first section and second section of the folding side stay away from each other it locks the folding side stay into position.

The locking member may lock the first and second sections of the side stay together at a first location, which is separated along the length of the side stay from the axis of folding of side stay. As a result of there being two separated points of engagement between the first and second sections, the side stay is able to be locked in the unfolded position. The first and second sections of the side stay may engage each other directly in the region of the locking member. Alternatively, the locking member may engage with each of the first and second sections of the side stay so as to cause the first and second sections to be in indirect engagement with each other in the region of the locking member.

The locking member may comprise a first formation moveable relative to, and engageable with, a second formation, such that when the first and second formations engage, the locking member is in a locked condition (i.e. obstructing movement of the first and second sections of the side stay apart from each other). For example, the first formation may be in the form of a pin and the second formation in the form of cylindrical passageway or recess. The first formation may be arranged for sliding movement. The first formation may be in the form of a bolt.

The locking mechanism may include a breaking member located between the first section and second section of the folding side stay to assist in breaking the folding side stay when the landing gear is moved into the stowed position. The breaking member may be arranged to act to reduce the force needed to start the folding side stay folding, hence reducing the force required to retract the aircraft landing gear. The first section and second section of the folding side stay in the deployed position may be locked in an over centre position. Being locked in an over centre position means that the side stay resists movement of the landing gear away from the deployed position, unless or until the side stay is moved from its over-centre position to an under-centre position. Extra force or movement, such as that able to be provided by the breaking member, may thus be required to break the folded side stay once it has been locked.

It will be appreciated that the first and second sections of the folding side stay, when in its unfolded state (when the landing gear is moved into the deployed position), lie along a substantially straight line; that is, they either lie on a straight line or (for example, in the over centre position) are slightly inclined with respect to each other.

The aircraft landing gear may include two folding side stays with integral locking mechanisms. Providing an aircraft landing gear with two side stays may be advantageous when the landing gear is arranged to be mounted on composite wing structures as the anchoring force between the landing gear and the wing is required to be spread over a greater area. Increasing the number of conventional folding side stays on a composite wing would require an increase in the number of lock stays and down lock actuators, thereby exacerbating the airframe noise created during landing and take-off. If the lock stays and down lock actuators are eliminated, in accordance with embodiments of the present invention, then the increase in airframe noise created by the provision of an extra folding side stay may advantageously be reduced.

The landing gear and folding side stay may be used on an aircraft. Thus, the present invention further provides an aircraft including a stowable landing gear, the landing gear including a folding side stay with an integral locking mechanism. The folding side stay and the integral locking mechanism may be as described herein with reference to the present invention. The landing gear leg may be mounted on the aircraft at two separate mounting points (first and second mounting points). The folding side stay may be connected at one end to a third mounting point on the aircraft (different from the first and second). The folding side stay may be connected at the opposite end to the landing gear leg. A second folding side stay may be connected at one end to a fourth mounting point on the aircraft (different from the first, second and third). There may be no locking side stays connected to the folding side stays.

The invention also provides a method of locking or unlocking a folding side stay, with an integral locking mechanism, of an aircraft landing gear. Such a method may include a step of providing a folding side stay, having an integral locking mechanism, in accordance with the present invention. The integral locking mechanism of the folding side stay may operate automatically, for example, to lock the folding side stay in position. The method may include a step of actuating the integral locking mechanism of the folding side stay.

The invention provides a method of locking a folding side stay of an aircraft landing gear when the landing gear is in the deployed position including the steps of:

provinding a folding side stay comprising a first section, a second section foldable relative to the first section and an integral locking mechanism;

extending the landing gear to the deployed position;

actuating the integral locking mechanism such that it locks the folding side stay.

The invention further provides a method of locking a folding side stay of an aircraft landing gear when the landing gear is in the deployed position, including the steps of:

providing a folding side stay comprising a first section and a second section foldable relative to the first section wherein a piston is located only within a first section of the side stay, extending the landing gear to the deployed position, and actuating the piston from its position within the first section to a position where it is located both in the first section and in the second section of the folding side stay.

The invention further provides method of unlocking a folding side stay of an aircraft landing gear when the landing gear is in the deployed position, including the steps of:

providing a folding side stay comprising a first section and second section foldable relative to the first section wherein a piston is located both in the first section and second section of the folding side stay, and retracting the piston from its position within the second section to a position where it is located only within the first section of the folding side stay.

The invention further provides a method of locking a folding side stay of an aircraft landing gear when the landing gear is in the deployed position, including the steps of:

providing a folding side stay comprising a first section and second section foldable relative to the first section, the folding side stay being arranged such that when the landing gear is in the deployed position a first section of the folding side stay is brought into engagement with at least part of the second section of the folding side stay;

moving a locking member in the second section of the folding side stay from a first position in which it does not obstruct the first section of the folding side stay to a second position in which it does obstruct the first section of the folding side stay, thereby locking the folding side stay into place.

The invention further provides a method of unlocking a folding side stay of an aircraft landing gear when the landing gear is in the deployed position, including the steps of:

providing a folding side stay comprising a first and second section foldable relative to the first section, the folding side stay being arranged such that when the landing gear is in the deployed position the first section of the folding side stay has been brought into engagement with at least part of the second section of the folding side stay with a locking member in the second section of the folding side stay obstructing the movement of the first section of the folding side stay, and moving the locking member into a position where it no longer obstructs the first section of the folding side stay.

The method may further include a step of actuating a breaking member, for example located in the second section of the folding side stay, to push the first section of the side stay out of from its position in engagement with at least part of the second section of the landing gear.

The invention also provides a folding side stay suitable for installation on an aircraft landing gear comprising a first section and second section foldable relative to the first section and an integral locking mechanism for locking the first section and second section of the folding side stay into position when the landing gear is in the deployed position. The folding side stay may have fixings for mounting the side stay on a landing gear.

The folding side stay may be retrofitted to an aircraft landing gear, which has already been installed on an aircraft. The present invention also provides a locking mechanism for converting a folding side stay without an integral locking mechanism into a folding side stay in accordance with any aspect of the present invention.

The present invention may be of greater application to larger aircraft. The aircraft is preferably heavier than 50 tonnes dry weight, and more preferably heavier than 200 tonnes dry weight. The aircraft is preferably of a size equivalent to an aircraft designed to carry more than 75 passengers, and more preferably more than 200 passengers

BRIEF DESCRIPTION OF THE DRAWINGS

Embodiments of the invention will now be described, by way of example only, with reference to the accompanying schematic drawings of which.

DETAILED DESCRIPTION OF THE DRAWINGS

Figure 2:
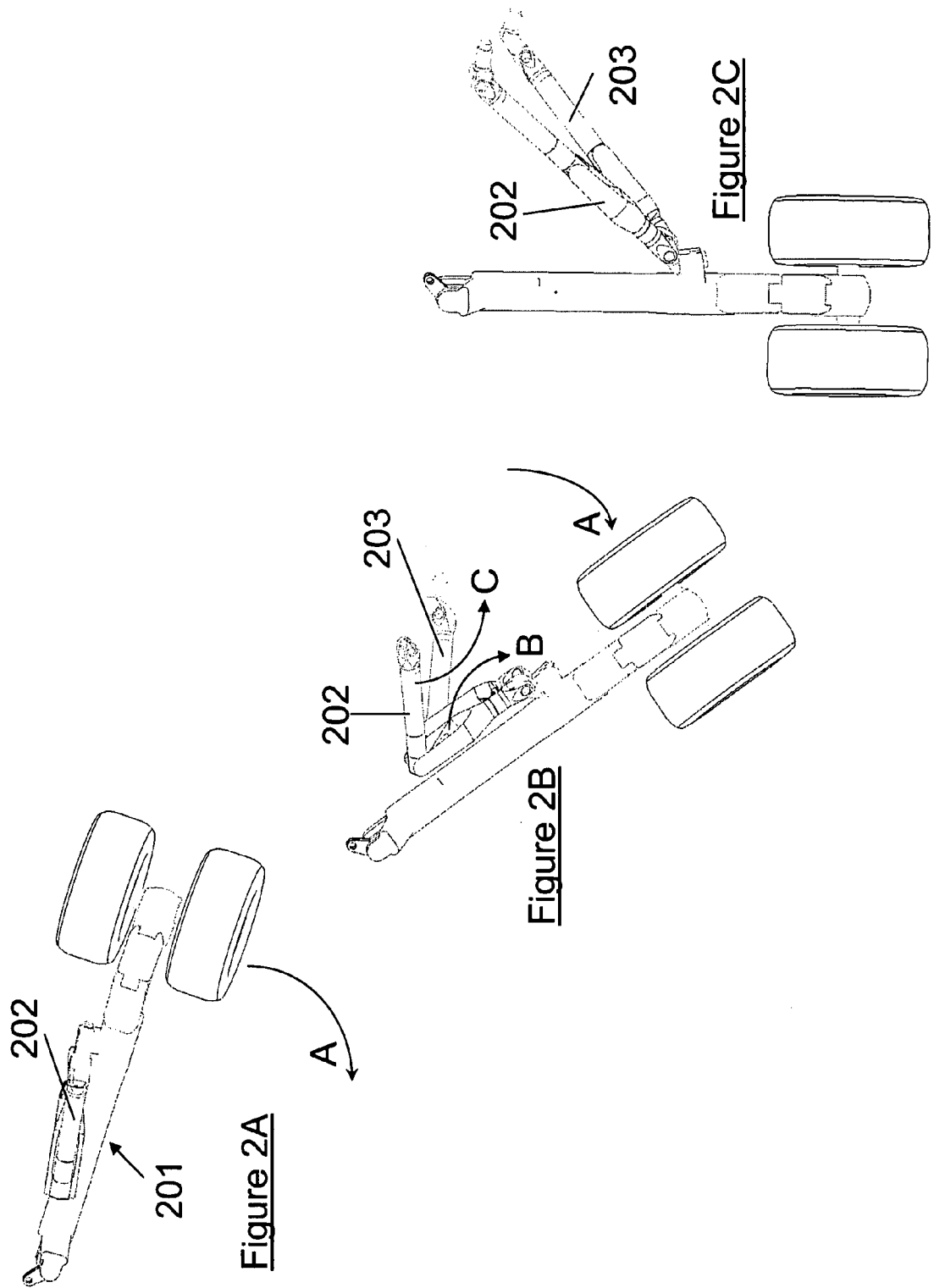
FIGS. 2A, 2B and 2C show a landing gear including two folding side stays moving between the retracted/stowed position and the deployed position.

FIG. 2A shows a front view of an aircraft landing gear 201 in a retracted, stowed position. In this embodiment, the landing gear is locked in the stowed position and so the position may also be referred to as the uplock position. The landing gear 201 includes a first folding side stay 202 and a second folding side stay 203, both of the folding side stays 202 and 203 in a fully folded position. The arrow A indicates the position in which the landing gear 201 moves when it is deployed.

FIG. 2B shows a front view of the landing gear 201 when halfway between being in the retracted, stowed position and the deployed position. The arrows B and C indicate the movement of the folding side stays 202 and 203 as they unfold.

FIG. 2C shows a front view of the landing gear 201 when in the deployed position. As can be seen, the first and second folding side stays 202 and 203 have unfolded and straightened, and are in position to support the landing gear 201 and assist the landing gear to stay in the deployed position.

Figure 1:
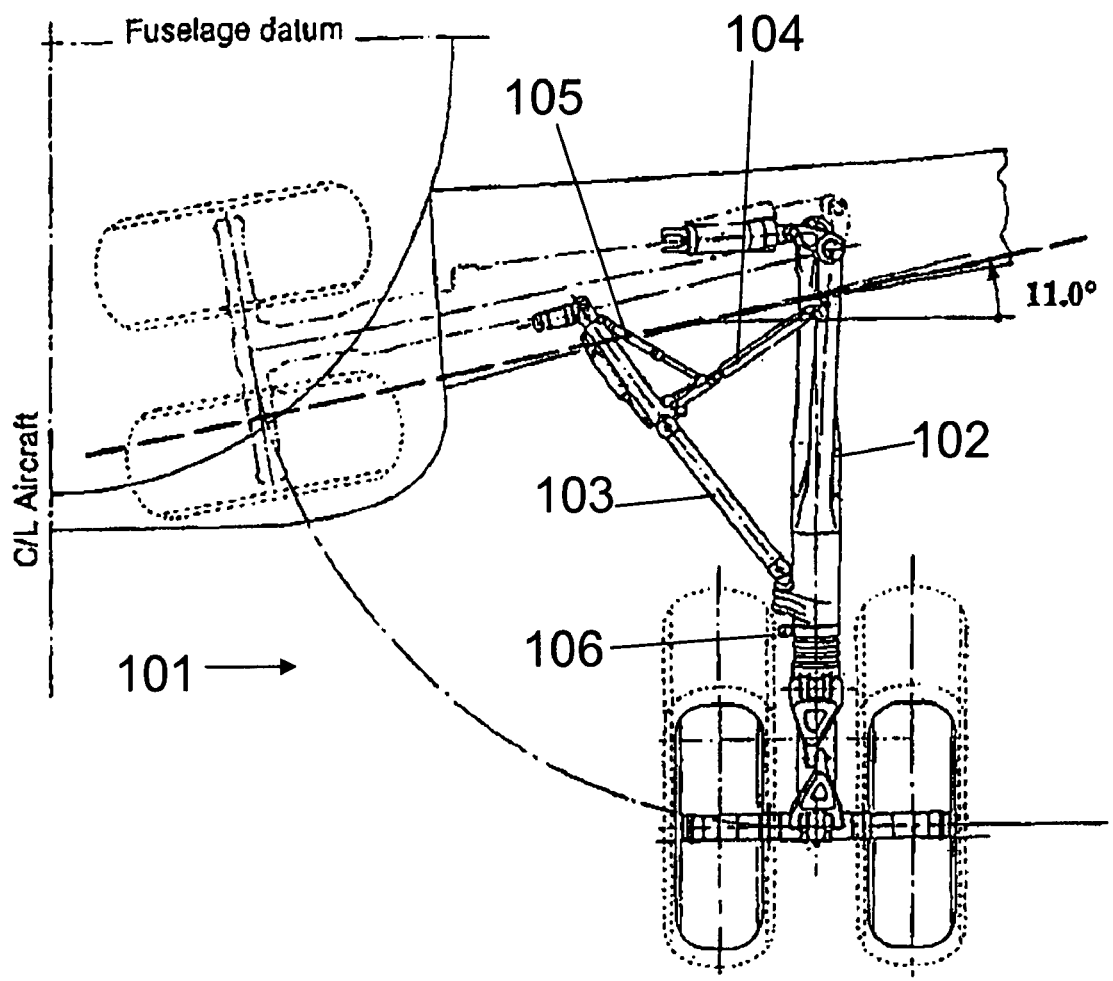
FIG. 1 shows a prior art landing gear.

The landing gear assembly shown in FIGS. 2A to 2C exemplifies the general concept of the present invention, in that there is a folding side stay with an integral locking mechanism, that allows the folding side stay to operate without the need to provide an extra (noise-inducing) lock-stay and down lock actuator, as is required in the prior art arrangement illustrated in FIG. 1. In this embodiment, the integral locking mechanism locks the landing gear in the deployed position and so the position may also be referred to as the downlock position. The folding side stay and its integral locking mechanism may take a variety of forms, and those are illustrated and described with reference to various embodiments of the invention.

Figure 3:
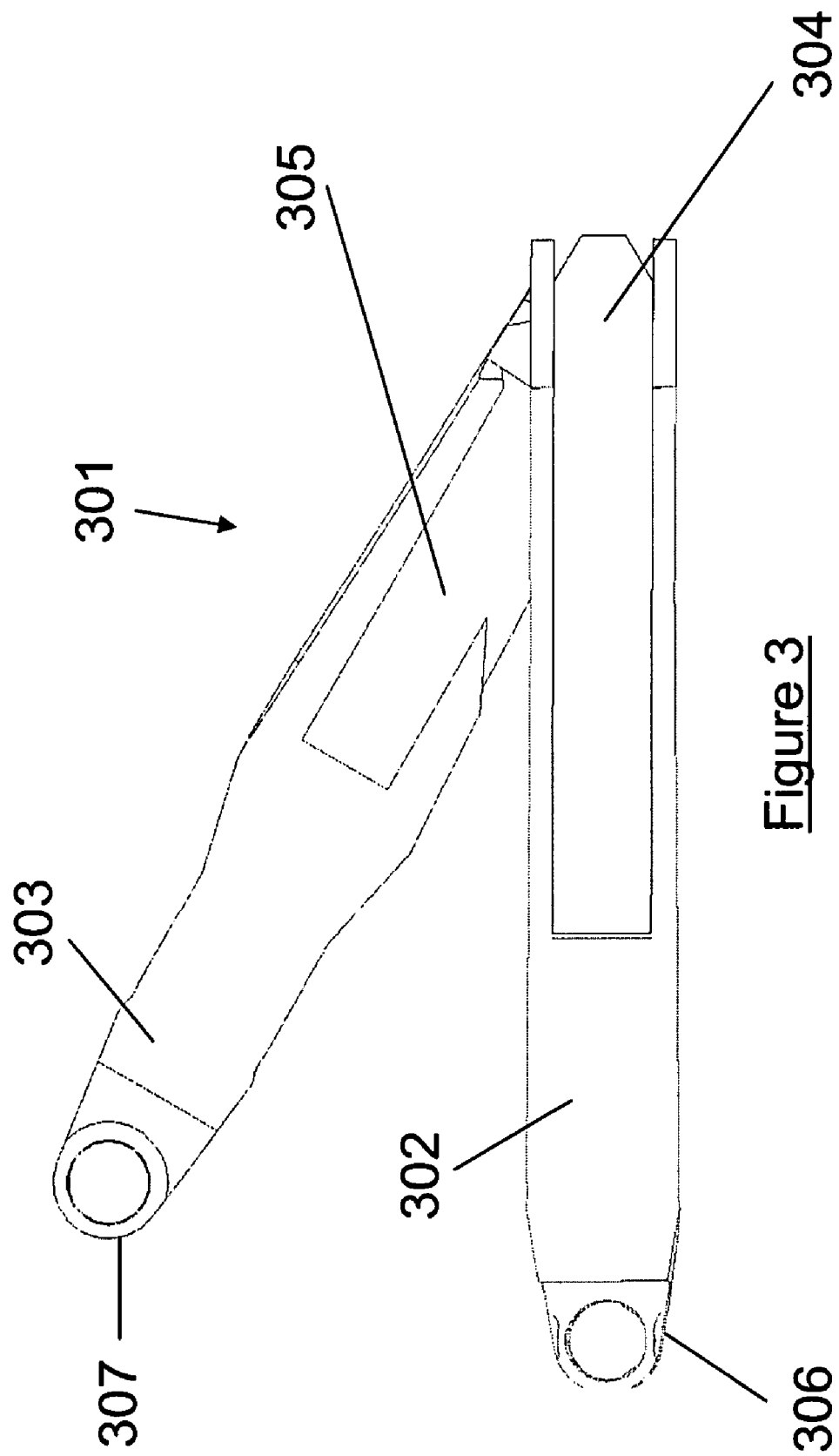
FIG. 3 shows a folding side stay according to a first embodiment of the invention, the folding side stay in the folded position.

FIG. 3 shows a folding side stay 301 according to a first embodiment of the invention. The folding side stay 301 comprises a first section 302, a second section 303, a piston 304 located within the first section 302, a cavity 305 located within the second section 303, and fixings 306 and 307 located on the ends of the first and second sections, 302 and 303, of the landing gear for attachment to the aircraft and the landing gear main fitting respectively. The first section 302 also includes hydraulic means (not shown) by which to extend the piston 304 away from the first section 302 and partially into the second section 303. The hydraulic means is also able to retract the piston 304 back from its position partially located in the second section 303 into the position of being fully located within the first section 302. The first section 302 and the second section 303 are connected by a hinge 308 which allows folding movement between the two sections. In this embodiment, the first section 302 is the upper section of the folding side stay 301 and the fixing 306 is attached to the rear spar of the aircraft wing. The second section 303 is the lower section (when in use and unfolded) of the folding side stay 301 and the fixing 307 is attached to the landing gear main fitting. In FIG. 3 the piston 304 is located fully within the first section 302 of the folding side stay 301. In this position the piston 304 does not obstruct the folding movement of the folding side stay 301.

Figure 4:
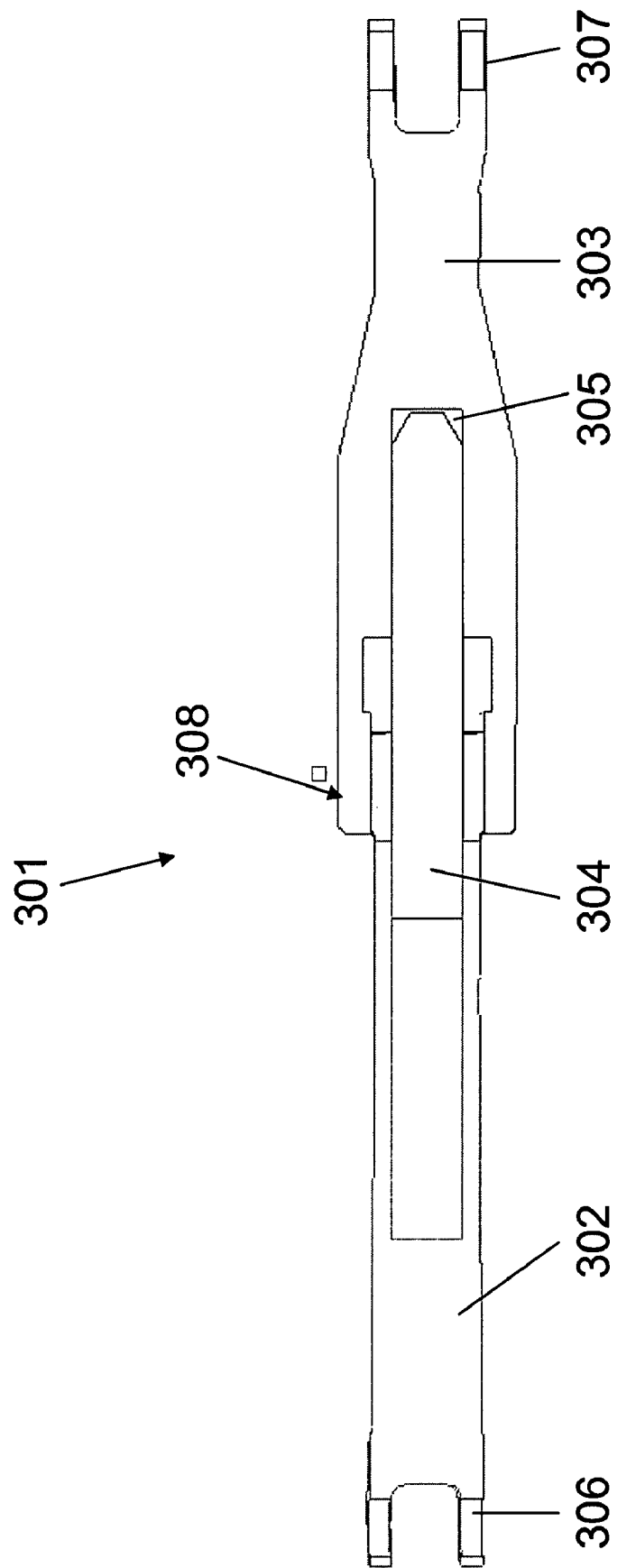
FIG. 4 shows the folding side stay according to the first embodiment of the invention in a deployed and locked position.

As described above with regard to FIG. 2, when in the deployed, downlock position the folding side stay is straightened, such that the first section 302 and second section 303 lie upon a substantially straight line. As shown in FIG. 4, once the folding side stay is straightened (fully unfolded), the piston 304 is brought into alignment with the cavity 304 in the second section 303. In order to lock the folding side stay 301 so that it may provide support to the landing gear, the piston 304 is pushed by the hydraulic means included in the first section 302 towards and into the cavity 305 in the second section 303. The movement is stopped when the piston 304 is located both in the first section 302 and second section 303. The piston 304 and cavity 305 are dimensioned such that they are a tight fit. In order to assist in the extension of the piston 304 into the cavity 305 the piston includes a tapered end as shown in the Figures. The piston 304 when extended engages the interior surface of both the first and second sections of the side stay, along substantially the entire length of the piston (excluding its tapering end). The piston 304 and cavity 305 are a tight fit. There are thus provided many points of engagement between the piston and the folding sections of the side that restrict/prevent the movement of the first section 302 and second section 303 apart from each other, thereby locking the folding side stay 301 into place. In particular, there is provided a first point of direct engagement between one end of the piston and a part of the first section 302 of the side stay and a second point of direct engagement between the other end of the piston and a part of the second section 303 of the side stay.

For safety reasons, is a requirement that the landing gear is able to be deployed in the event of a hydraulic failure on the aircraft. In order to ensure that the folding side stay 301 can still be locked in the event of such a failure a hydraulic accumulator may be associated with the piston 304. Should the aircraft suffer hydraulics failure, the accumulator has enough pressure to extend the piston 304 into the cavity 305, thereby locking the folding side stay 301.

In order to retract the landing gear after take off the folding side stay 301 must be unlocked. The unlocking procedure is the reverse of the locking procedure. The piston 304, controlled by hydraulics, is retracted from its position shown in FIG. 4, located both in the first section 302 and second section 303, until it is only located within the first section 302. The folding side stay 301 can then be folded and the landing gear retracted.

An alternative (not illustrated) embodiment similar to the first embodiment of the invention includes a sleeve located around the outside of the first section of the folding side stay instead of a piston located within the folding side stay. When the folding side stay is in the straightened position, the sleeve is movable to a position where it is located both around part of the first section and second section of the folding side stay. The sleeve thereby provides a first point of engagement between a part of the sleeve with a part of only the first section of the side stay and a second point of engagement with a part of only the second section of the side stay, the first and second points of engagement being at opposite ends of the sleeve. As there are at least two longitudinally separated points of engagement that prevent the movement of the first section and second section apart from each other, the folding side stay is locked into place. In order to unlock the folding side stay the sleeve is moved to a position where it is only located around the outside of the first section of the folding side stay. The movement of the sleeve may be by a simple sliding action or the sleeve may extend telescopically.

Figure 5:
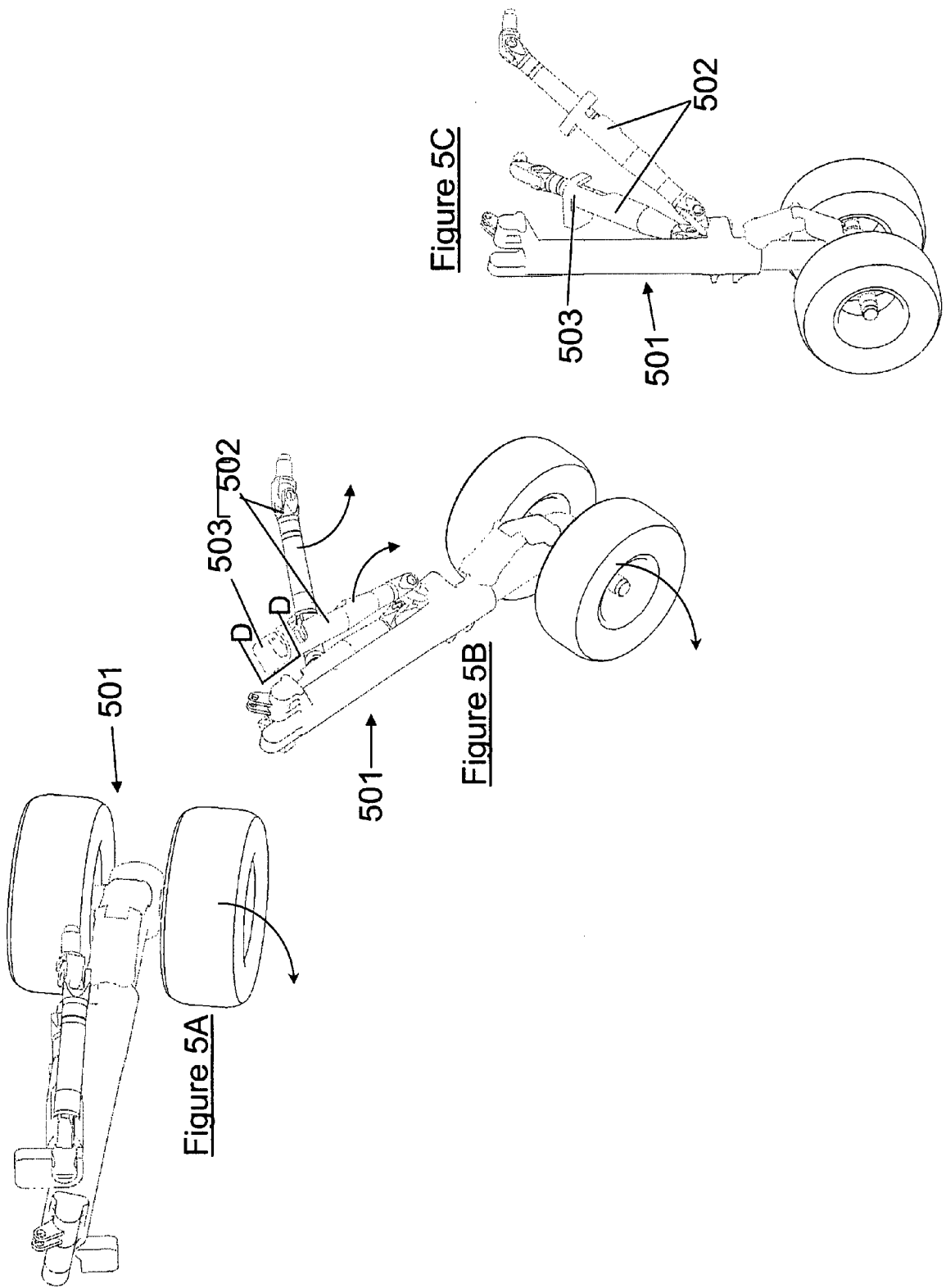
FIGS. 5A to 5C shows the unfolding of a folding side stay according to a second embodiment of the invention.

FIGS. 5a to 5c show side views of a landing gear 501 including two folding side stays 502, each including a locking mechanism 503 according to a second embodiment of the invention. FIG. 5a shows the landing gear 501 in the stowed, uplock position, with the folding side stays 502 folded, FIG. 5c shows the landing gear 501 in the deployed position, with the folding side stays 502 fully unfolded and substantially straight, and FIG. 5b shows the landing gear 501 in a position midway between the stowed and deployed position, with the folding side stays 502 partially unfolded. In the first embodiment, the locking mechanism comprises a member (for example a piston or a sleeve) that moves along the length of the first and second sections of the side stay to form a beam-like member extending from the first section via the fold axis to the second section of the side stay, thereby resisting folding of the side stay. The locking mechanism of the second embodiment differs from the first embodiment in that the locking of the folding side stay is effected by means of the first and second sections of the side stay, when unfolded, overlapping and connecting, tying together, or otherwise preventing movement apart of the first and second sections at the location of the overlap.

Figure 6:
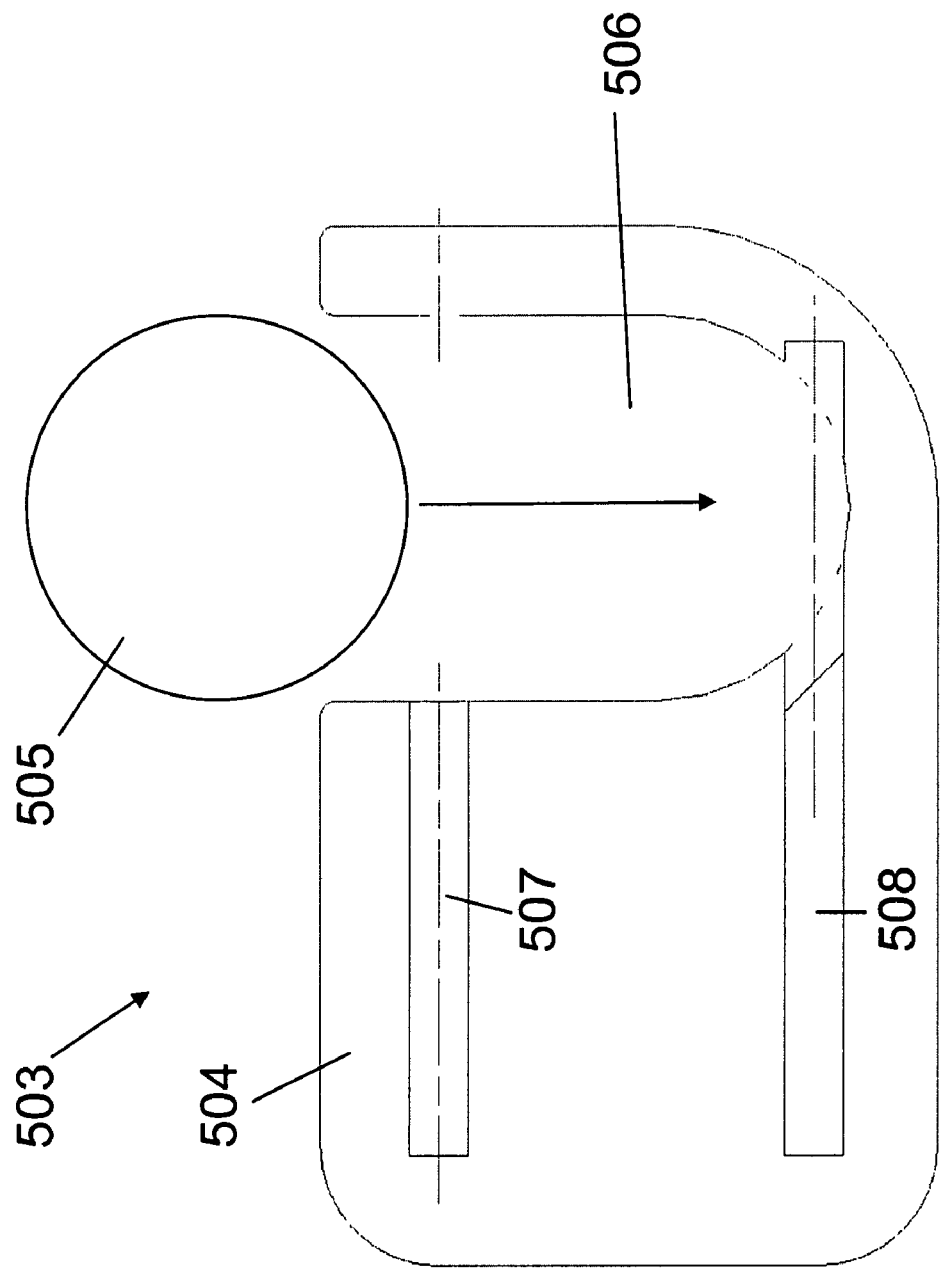
FIG. 6 shows the locking mechanism of the second embodiment of the invention in the unlocked position.
Figure 7:
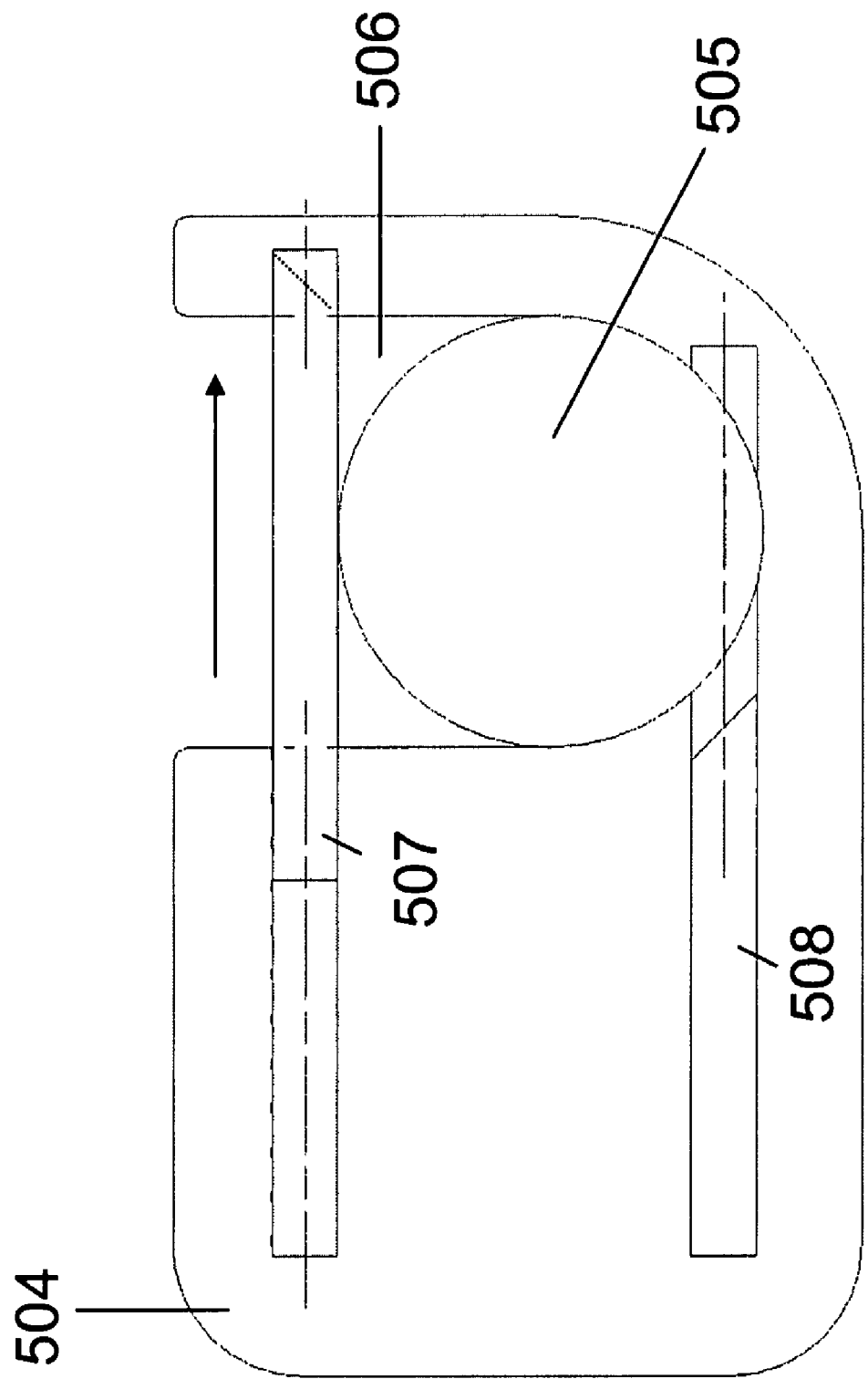
FIG. 7 shows the locking mechanism of the second embodiment of the invention in the locked position.

FIG. 6 shows the locking mechanism 503 through the section D-D of FIG. 5B and comprises an end of a first section of the folding side stay 504 and an end of a second section of the folding side stay 505. The end of the first section 504 comprises a receiving section 506 separated along the length of the side stay from the axis of folding of the side stay and a locking member 507, in this case a cylindrical pin, and breaking member 508, also a cylindrical pin, the breaking member 508 including a tapered end, and both the locking member 507 and breaking member 508 being hydraulically controlled. The end of the second section of the folding side stay 505 is approximately cylindrical and the receiving section 506 is so shaped as to receive the end of the second section 505. When the landing gear 501 is fully deployed (see FIG. 5C) the folding side stay 502 is in a straightened, fully extended position such that the first section and second section lie upon a substantially straight line. When in this straightened position, as shown in FIG. 7, the second end 505 is located fully within the receiving section. The locking member 507 is slid from within the body of the end of the first section 504, as shown in FIG. 6, such that it extends over the receiving section 506 and obstructs the end of the second section 505 from moving back out of the receiving section. The end of the second section is thus enclosed by the receiving section 506 of the first section 504.

The locking member locks the first and second sections of the side stay together at this first location, which is separated along the length of the side stay from the folding axis of the side stay.

Figure 8A:
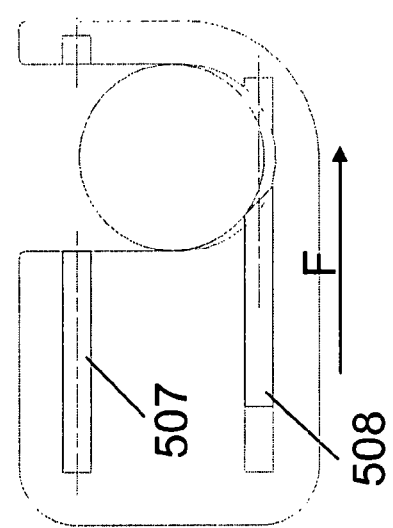
FIGS. 8A, 8B, 8C and 8D show the unlocking procedure of the second embodiment of the invention.
Figure 8B:
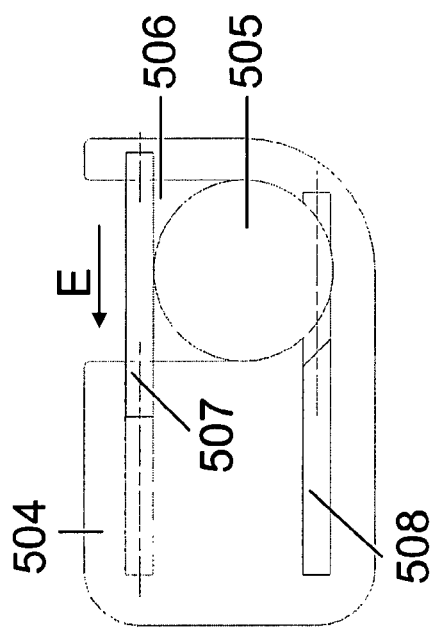
Figure 8C:
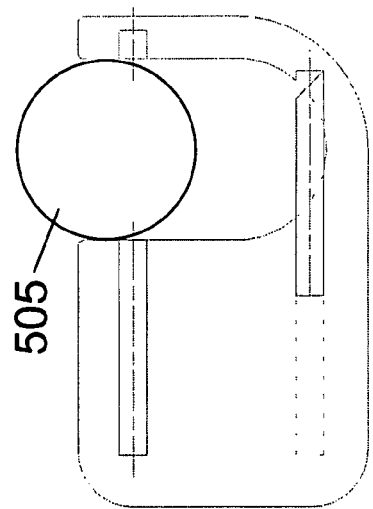
Figure 8D:
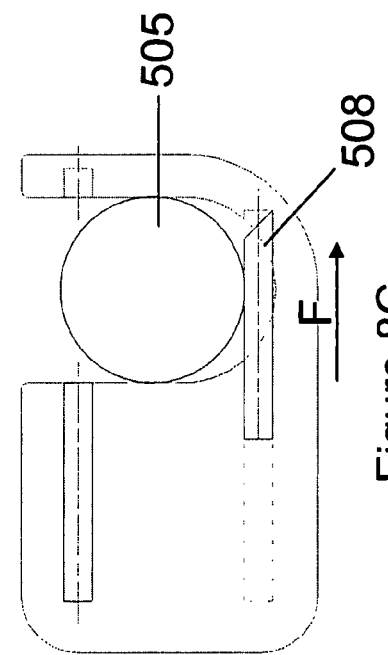

FIGS. 8A-D show the procedure followed for unlocking the folding side stay 502. FIG. 8A shows the locking mechanism 503 in the locked position, with the locking member 507 obstructing the movement of the end of the second section 505, which is located within the receiving section 506 of the end of the first section 504. To initiate the unlocking procedure the locking member 507 is retracted from the position shown in 8A in the direction of the arrow E. Once the locking member 507 has been fully retracted, as shown in FIG. 8B, the breaking member 508 is extended in the direction of the arrow F. The tapered end of the breaking member 508 becomes wedged under the end of the second section 505 and pushes it from the bottom of the receiving section 504, as shown in FIG. 8C. This reduces the force required to retract the landing gear, in particular the "breaking force" needed to initiate the retraction of the landing gear. As the landing gear 501 is retracted, the end of the second section 505 continues to move out of the receiving section 506, as shown in FIG. 8D, until it is fully removed and the folding side stay 502 can be folded freely.

Whilst the present invention has been described and illustrated with reference to particular embodiments, it will be appreciated by those of ordinary skill in the art that the invention lends itself to many different variations not specifically illustrated herein. Some examples of such variations and alternatives have been described above. Some other variations will now be described, by way of example. The locking mechanisms as described above are hydraulically actuated. They could alternatively be pneumatically or mechanically actuated. The locking member and breaking member as described in the second illustrated embodiment are cylindrical pins; however, the pins may have any suitable cross section, such as a square or triangular cross section. The locking member and breaking member may be in the form of plates.

In the second embodiment, when the landing gear is fully deployed and the folding side stay is fully unfolded, it is stated that the side stay is straightened. It will be appreciated that whilst substantially straight, the side stay may include a slight bend at the fold axis. Such a slight bend could be of benefit, in that if the folding side stay has passed "over-centre" when the landing gear is in the deployed position, the structure can readily be arranged to prevent the landing gear from unintentionally moving, during normal use, from the deployed position. The side stay may be urged into the over-centre position by the pin that defines the locking member. That pin may, in such a case, have a tapered end to assist the pin in urging the end of the second section of the folding side stay into the over-centre position.

The illustrated embodiments each feature a single landing gear associated with two folding side stays. Only one folding side stay may be provided.

The sleeve mentioned above need not extend around the entire circumference of the side stay.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. A retractable landing gear for an aircraft, said landing gear movable between a stowed position and a deployed position, said landing gear comprising at least one folding side stay, said at least one folding side stay comprising:
   a first section having a longitudinal axis;
   a second section having a longitudinal axis, said second section foldable relative to the first, section; and
   an integral locking mechanism for locking the first section and second section of the at least one folding side stay into position when the landing gear is in the deployed position, wherein the integral locking mechanism comprises a piston located within the first section and extendable, in a direction parallel to said first and second section longitudinal axes, into at least a portion of the second section of the at least one folding side stay.

2. An aircraft landing gear as claimed in claim 1, wherein the piston has a tapered end to aid the location of the piston into the second section of the at least one folding side stay.

3. An aircraft landing gear, said landing gear movable between a stowed position and a deployed position, said landing gear comprising at least one folding side stay, said at least one folding side stay comprising:
   a first section;
   a second section foldable relative to the first section; and
   an integral locking mechanism for locking the first section and second section of the at least one folding side stay into position when the landing gear is in the deployed position, wherein the integral locking mechanism is a sleeve located around the outside of the first section of the at least one folding side stay and movable to be partially located over the second section of the at least one folding side stay.

4. An aircraft landing gear as claimed in claim 1, wherein the at least one folding side stay is configured such that, when the landing gear is in the deployed position, at least part of the first section of the at least one folding side stay is brought into engagement with at least a part of the second section of the at least one folding side stay and the integral locking mechanism comprises a locking member arranged to obstruct the movement of the first section and second section of the at least one folding side stay away from each other, wherein an end of said first section includes a receiving section, said receiving section separated from a folding axis of the first and second sections and an end of said second section is a substantially cylindrical portion and during said engagement, said receiving section engages at least a portion of said substantially cylindrical portion.

5. An aircraft landing gear as claimed in claim 4, wherein the locking mechanism includes a breaking member located between the first section and second section of the at least one folding side stay to assist in breaking the at least one folding side stay when the landing gear is moved into the stowed position.

6. An aircraft landing gear as claimed in claim 4, wherein the first section and second section of the at least one folding side stay in the deployed position are locked in an over centre position.

7. An aircraft landing gear as claimed in claim 1 including two folding side stays, said two folding side stays including integral locking mechanisms.

8. A method of locking a folding side stay of an aircraft retractable landing gear, said landing gear moveable between a stowed position and a deployed position, when the landing gear is in the deployed position including the steps of:
   providing a folding side stay comprising a first section, a second section, said second section foldable relative to the first section, and an integral locking mechanism, wherein the integral locking mechanism is a sleeve located around the outside of the first section and moveable to be at least partially located over the second section;
   extending the landing gear to the deployed position;
   actuating the sleeve to be located at least partially over the second section of the folding side stay.

9. A method of locking a folding side stay of an aircraft retractable landing gear, said landing gear moveable between a stowed position and a deployed position, when the landing gear is in the deployed position, including the steps of:
   providing a folding side stay comprising a first section having a longitudinal axis and a second section having a longitudinal axis, said second section foldable relative to the first section and a piston located only within a first section of the side stay,
   extending landing gear to the deployed position, and
   actuating the piston from its position within the first section to extend in a direction parallel to said longitudinal axes and to a position where it is located both in the first section and in the second section of the folding side stay.

10. A method of unlocking a folding side stay of an aircraft retractable landing gear, said landing gear moveable between a stowed position and a deployed position, when the landing gear is in the deployed position, including the steps of:
    providing a folding side stay comprising a first section having a longitudinal axis and a second section having a longitudinal axis, said second section foldable relative to the first section, and a piston located in both the first section and the second section of the folding side stay, and
    retracting the piston in a direction parallel with said longitudinal axes from its position within the second section to a position where it is located only within the first section of the folding side stay.

11. A method of locking a folding side stay of an aircraft retractable landing gear, said landing gear moveable between a stowed position and a deployed position, when the landing gear is in the deployed position, including the steps of:
    providing a folding side stay comprising a first and second section foldable relative to the first section,
    the folding side stay being arranged such that when the landing gear is in the deployed position a first section of the folding side stay is brought into engagement with at least part of the second section of the folding side stay; and
    moving a locking member in the second section of the folding side stay from a first position in which it does not obstruct the first section of the folding side stay to a second position in which it does obstruct the first section of the folding side stay,
    thereby locking the folding side stay into place, wherein an end of said first section includes a receiving section, said receiving section separated from a folding axis of the first and second sections and an end of said second section is a substantially cylindrical portion and during said engagement, said receiving section engages at least a portion of said substantially cylindrical portion.

12. A method of unlocking a folding side stay of an aircraft retractable landing gear, said landing gear moveable between a stowed position and a deployed position, when the landing gear is in the deployed position, including the steps of:
    providing a folding side stay comprising a first section and second section foldable relative to the first section,
    the folding side stay being arranged such that when the landing gear is in the deployed position the first section of the folding side stay has been brought into engagement with at least part of the second section of the folding side stay with, a locking member in the second section of the folding side stay obstructing the movement of the first section of the folding side stay, and
    moving the locking member into a position where it no longer obstructs the first section of the folding side stay, wherein an end of said first section includes a receiving section, said receiving section separated from a folding axis of the first and second sections and an end of said second section is a substantially cylindrical portion and during said engagement, said receiving section engages at least a portion of said substantially cylindrical portion.

13. A method of unlocking a folding side stay of an aircraft landing gear according to claim 12, further including the step of actuating a breaking member located in the second section of the folding landing gear to push the first section of the landing gear out of from its position in engagement with at least part of the cavity of the second section of the landing gear.

14. An aircraft comprising a retractable landing gear as claimed in claim 1.

15. An aircraft landing gear movable between an stowed and deployed position comprising a folding side stay, the folding side stay comprising a first section and a second section foldable relative to the first section and an integral locking mechanism for locking the first section and second section of the folding side stay into position when the landing gear is in the deployed position, wherein the integral locking mechanism is a sleeve located around the outside of the first section of the folding side stay and movable to be partially located over the second section of the folding side stay.

16. A method of unlocking a folding side stay of an aircraft retractable landing gear, said landing gear movable between a stowed position and a deployed position, when the landing gear is in the deployed position including the steps of:
    providing a folding side stay comprising a first section, a second section foldable relative to the first section and an integral locking mechanism, wherein the integral locking mechanism is a sleeve located around the outside of the first section of the folding side stay and partially located over the second section of the folding side stay;
    actuating the sleeve to a position where it is located only over the first section of the folding side stay.

* * * * *